United States Patent
Wang et al.

(10) Patent No.: US 10,630,995 B2
(45) Date of Patent: Apr. 21, 2020

(54) VIDEO COMPRESSED SENSING RECONSTRUCTION METHOD, SYSTEM, ELECTRONIC DEVICE, AND STORAGE MEDIUM

(71) Applicant: PING AN TECHNOLOGY (SHENZHEN) CO., LTD., Shenzhen (CN)

(72) Inventors: Jianzong Wang, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/084,234

(22) PCT Filed: Jun. 30, 2017

(86) PCT No.: PCT/CN2017/091311
§ 371 (c)(1),
(2) Date: Sep. 12, 2018

(87) PCT Pub. No.: WO2018/120723
PCT Pub. Date: Jul. 5, 2018

(65) Prior Publication Data
US 2019/0075309 A1    Mar. 7, 2019

(30) Foreign Application Priority Data
Dec. 30, 2016    (CN) .......................... 2016 1 1260793

(51) Int. Cl.
*H04N 19/30*    (2014.01)
*H04N 19/172*    (2014.01)
(Continued)

(52) U.S. Cl.
CPC ............. *H04N 19/30* (2014.11); *H04N 19/14* (2014.11); *H04N 19/172* (2014.11);
(Continued)

(58) Field of Classification Search
CPC ........ H04N 19/14; H04N 19/30; H04N 19/89; H04N 19/172; H04N 19/176
See application file for complete search history.

(56) References Cited

U.S. PATENT DOCUMENTS

| 6,577,700 | B1 | 6/2003 | Fan et al. |
| 2017/0264902 | A1* | 9/2017 | Ye .......................... H04N 19/124 |

FOREIGN PATENT DOCUMENTS

| CN | 1670757 A | 9/2005 |
| CN | 104978612 A | 10/2015 |

(Continued)

OTHER PUBLICATIONS

1st Examination Report of counterpart Australian Standard Patent Application No. 2017389534 dated Sep. 19, 2019.
(Continued)

*Primary Examiner* — Tsion B Owens

(57) ABSTRACT

The present disclosure provides a video compressed sensing reconstruction method, including: step B, after receiving to-be-reconstructed compressed video frames, extracting frame fragments of the compressed video frames according to a predetermined extraction rule; step C, inputting the frame fragments into an input layer of a pre-trained video frame reconstruction model, performing feature abstraction to the frame fragments through multiple hidden layers of the video frame reconstruction model, and building a nonlinear mapping between each frame fragment and a corresponding frame fragment block; and step D, reconstructing the input frame fragments to frame fragment blocks by the hidden layers according to the nonlinear mapping, and outputting the frame fragment blocks by an output layer of the video frame reconstruction model, and generating a reconstructed video based on the reconstructed frame fragment blocks.
(Continued)

The present disclosure can render and reconstruct video frames quickly with a high quality.

3 Claims, 3 Drawing Sheets

(51) Int. Cl.
*H04N 19/42* (2014.01)
*H04N 19/14* (2014.01)
*H04N 19/176* (2014.01)
*H04N 19/89* (2014.01)

(52) U.S. Cl.
CPC ........... *H04N 19/176* (2014.11); *H04N 19/42* (2014.11); *H04N 19/89* (2014.11)

(56) References Cited

FOREIGN PATENT DOCUMENTS

| CN | 105163121 A | 12/2015 |
|---|---|---|
| CN | 105405054 A | 3/2016 |
| CN | 105740950 A | 7/2016 |
| CN | 105868769 A | 8/2016 |
| CN | 106204447 A | 12/2016 |
| CN | 106686385 A | 5/2017 |
| TW | 201520905 A | 6/2015 |
| WO | 2016/132148 A1 | 8/2016 |

OTHER PUBLICATIONS

Zhaowen Wang et al., Deep Networks for Image Super-Resolution with Sparse Prior, IEEE International Conference on Computer Vision (ICCV), 2015, pp. 370-378.

Chao Dong et al., Learning a Deep Convolutional Network for Image Super-Resolution, 13th European Conference on Computer Vision (ECCV), 2014, pp. 184-199.

Search report of counterpart European Patent Application No. 17885721.5 dated Oct. 9, 2019.

Michael Iliadis et al., Deep Fully-Connected Networks for Video Compressive Sensing, arxiv.org, Cornell University Library, Mar. 16, 2016, pp. 1-13.

\* cited by examiner

US 10,630,995 B2

VIDEO COMPRESSED SENSING RECONSTRUCTION METHOD, SYSTEM, ELECTRONIC DEVICE, AND STORAGE MEDIUM

CROSS REFERENCE OF RELATED APPLICATIONS

The present application claims the benefit of Chinese Application No. 2016112607936, entitled "video compressed sensing reconstruction method and device" filed on Dec. 30, 2016, the entire content of which is incorporated herein in its entirety.

TECHNICAL FIELD

The present disclosure relates to computer technologies, and more particularly, to a video compressed sensing reconstruction method, system, device and storage medium.

BACKGROUND

At present, typical video compressed sensing algorithms based on time domain are very sensitive to computing complexity; especially when video frames are rendered and reconstructed, the computing speed is extremely slow. The situation cannot be obviously improved even graphics processing units are used to achieve parallel acceleration. Although there are algorithms capable of finishing sensing and reconstruction of video blocks, the reconstruction quality is relatively low. Thus, how to render and reconstruct video frames rapidly with a high quality has become a technical problem to be solved.

SUMMARY OF THE DISCLOSURE

The present disclosure provides a video compressed sensing reconstruction method, system, electronic device, and storage medium for rendering and reconstructing video frames rapidly with a high quality.

A first aspect of the present disclosure provides a video compressed sensing reconstruction method, including:

step B, after receiving to-be-reconstructed compressed video frames, extracting frame fragments of the compressed video frames according to a predetermined extraction rule;

step C, inputting the frame fragments into an input layer of a pre-trained video frame reconstruction model, performing feature abstraction to the frame fragments through multiple hidden layers of the video frame reconstruction model, and building a nonlinear mapping between each frame fragment and a corresponding frame fragment block; and step D, reconstructing the input frame fragments to frame fragment blocks by the hidden layers according to the nonlinear mapping, and outputting the frame fragment blocks by an output layer of the video frame reconstruction model, and generating a reconstructed video based on the reconstructed frame fragment blocks.

A second aspect of the present disclosure provides a video compressed sensing reconstruction system, including:

an extraction module, configured for, after receiving to-be-reconstructed compressed video frames, extracting frame fragments of the compressed video frames according to a predetermined extraction rule;

a feature abstraction module, configured for inputting the frame fragments into an input layer of a pre-trained video frame reconstruction model, performing feature abstraction to the frame fragments through multiple hidden layers of the video frame reconstruction model, and building a nonlinear mapping between each frame fragment and a corresponding frame fragment block; and a reconstruction module, configured for reconstructing the input frame fragments to frame fragment blocks by the hidden layers according to the nonlinear mapping, outputting the frame fragment blocks by an output layer of the video frame reconstruction model, and generating a reconstructed video based on the reconstructed frame fragment blocks.

A third aspect of the present disclosure provides an electronic device including a processor, a storage device and a video compressed sensing reconstruction system; the video compressed sensing reconstruction system is stored in the storage device and includes at least one computer-readable instruction which is capable of being executed by the processor to perform:

after receiving to-be-reconstructed compressed video frames, extracting frame fragments of the compressed video frames according to a predetermined extraction rule;

inputting the frame fragments into an input layer of a pre-trained video frame reconstruction model, performing feature abstraction to the frame fragments through multiple hidden layers of the video frame reconstruction model, and building a nonlinear mapping between each frame fragment and a corresponding frame fragment block; and reconstructing the input frame fragments to frame fragment blocks by the multiple hidden layers according to the nonlinear mapping, outputting the frame fragment blocks by an output layer of the video frame reconstruction model, and generating a reconstructed video based on the reconstructed frame fragment blocks.

A fourth aspect of the present disclosure provides a computer-readable storage medium with at least one computer-readable instruction stored thereon, which can be executed by at least one processor to perform:

after receiving to-be-reconstructed compressed video frames, extracting frame fragments of the compressed video frames according to a predetermined extraction rule;

inputting the frame fragments into an input layer of a pre-trained video frame reconstruction model, performing feature abstraction to the frame fragments through multiple hidden layers of the video frame reconstruction model, and building a nonlinear mapping between each frame fragment and a corresponding frame fragment block; and reconstructing the input frame fragments to frame fragment blocks by the multiple hidden layers according to the nonlinear mapping, outputting the frame fragment blocks by an output layer of the video frame reconstruction model, and generating a reconstructed video based on the reconstructed frame fragment blocks.

In the method, system, electronic device, and storage medium of the present disclosure, the frame fragments of the to-be-reconstructed compressed video frames are extracted according to the predetermined extraction rule; feature abstraction is performed to each frame fragment through the multiple hidden layers of the pre-trained video frame reconstruction model, and the nonlinear mapping between each frame fragment and the corresponding frame fragment block is built; and the input frame fragments are reconstructed to the frame fragment blocks according to the nonlinear mapping, and the reconstructed video blocks are output. Since the reconstruction of the video is carried out corresponding to the frame fragments extracted from the to-be-reconstructed compressed video frames rather than by processing the large compressed video frames directly, thus the computing complexity is reduced and the reconstruction speed of the video is improved. In addition, since the feature abstraction of the frame fragment is carried out through the multiple hidden layers of the pre-trained video frame reconstruction model, and the frame fragments are reconstructed to the frame fragment blocks for outputting, each detailed feature of the compressed video frames can be effectively extracted and thus the quality of the reconstruction of the video frames is improved.

The realization of objectives, functional features and advantages of the present disclosure will be further described with reference to the accompanying drawings in combination with embodiments of the present disclosure.

PREFERRED EMBODIMENTS

For clearly understanding technical features, purpose, and effect of the present disclosure, embodiments are given in detail hereinafter with reference to the accompanying drawings.

Figure 1:
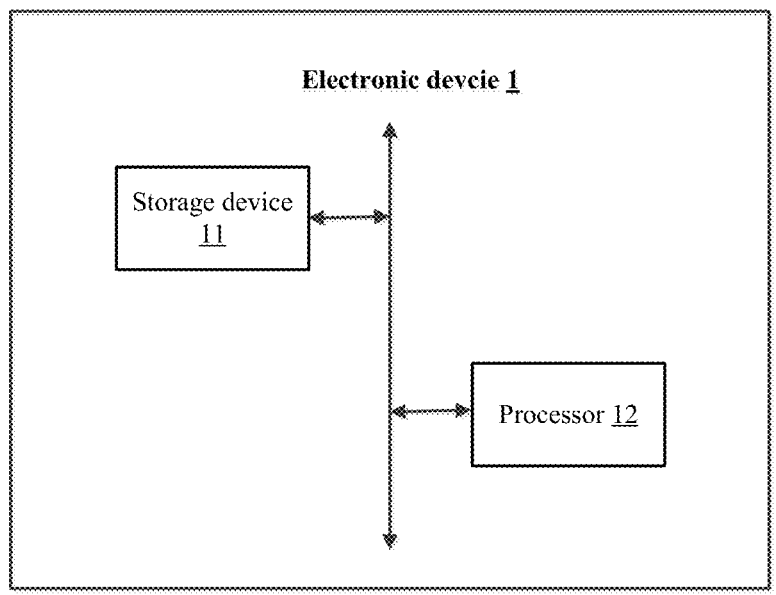
FIG. 1 is a schematic view showing an application environment of a video compressed sensing reconstruction method in accordance with an embodiment of the present disclosure.

FIG. 1 shows an application environment of a video compressed sensing reconstruction method in accordance with an embodiment of the present disclosure. An electronic device 1 can be one which is capable of performing numerical calculation and/or information processing automatically according to preset or pre-stored instructions. In some embodiments, the electronic device 1 can be a computer, a single network server, a server group having multiple network servers or a cloud server formed by a large number of host machines or network servers. Cloud computing is one type of distributed computing, referring to a super virtual computer formed by a group of discrete computers which are coupled together.

In the embodiment, the electronic device 1 includes a storage device 11 and a processor 12. The processor 12 is configured for supporting the operation and running of the electronic device 1, including one or more micro-processors or digital processors, etc. The storage device 11 is configured for storing various types of data or computer readable instructions. The storage device may include one or more non-volatile memory, such as ROM, EPROM, or flash memory. In an embodiment, the storage device 11 stores a video compressed sensing reconstruction program which includes at least one computer-readable instruction. The at least one computer-readable instruction can be executed by the processor 12 to perform a video compressed sensing reconstruction method of the present disclosure.

The present disclosure provides the video compressed sensing reconstruction method.

Figure 2:
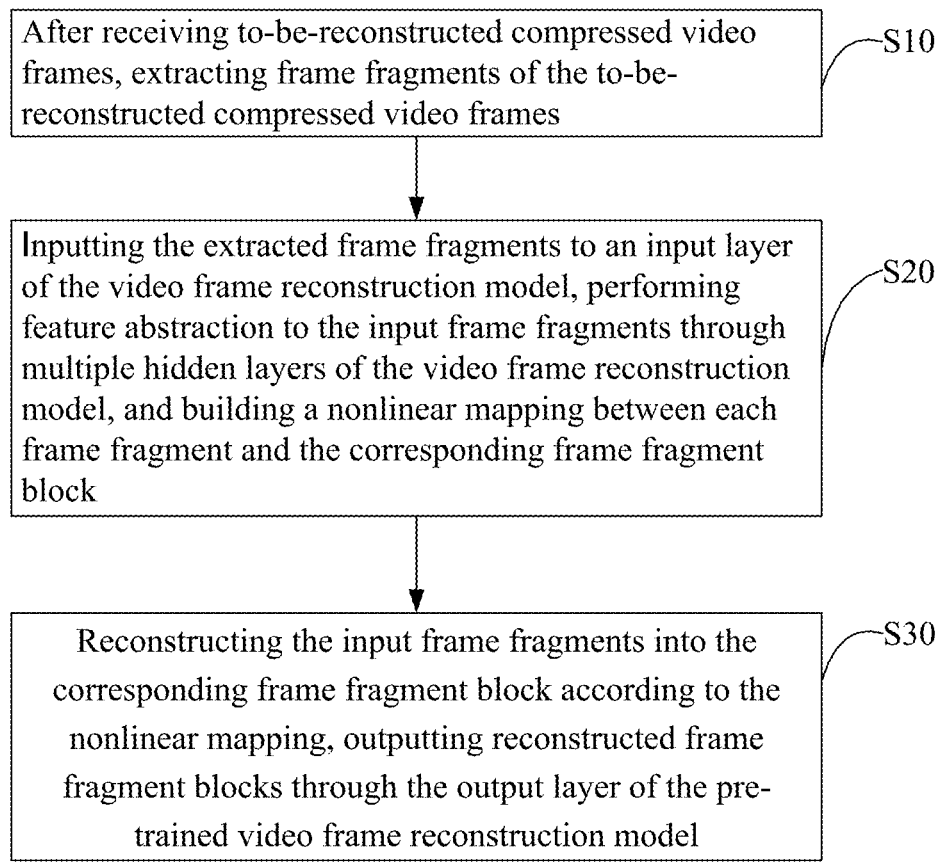
FIG. 2 is a flow chart illustrating processes of a video compressed sensing reconstruction method in accordance with a first embodiment of the present disclosure.

Referring to FIG. 2, which is a flow chart illustrating processes of the video compressed sensing reconstruction method in accordance with a first embodiment of the present disclosure, the video compressed sensing reconstruction method includes steps as follows.

Step S10, after receiving to-be-reconstructed compressed video frames, extracting frame fragments of the to-be-reconstructed compressed video frames according to a predetermined extraction rule.

In the embodiments, after the to-be-reconstructed compressed video frames are received, the compressed video frames are not rendered and reconstructed directly, and the frame fragments are extracted from the compressed video frames according to the predetermined extraction rule at first. The predetermined extraction rule can be extracting the frame fragments according to features like color, content, format, or area, etc., which is not limited herein.

In some embodiments, the predetermined extraction rule is: dividing the to-be-reconstructed compressed video frames into blocks such that the to-be-reconstructed compressed video frames are divided into several frame fragments. For example, various types of the compressed video frames, such as compressed video frames of JPEG or PNG type are divided into N*M frame fragments when the compressed video frames are divided into blocks, wherein N and M are positive integers. The frame fragments are equal to each other. In other embodiments, the compressed video frames can be divided into unequal frame fragments according to a preset ratio or randomly, which is not limited herein. Each frame fragment can have a regular shape like a square or a rectangle or irregular shapes, which is not limited herein.

Step S20, inputting the extracted frame fragments to an input layer of a pre-trained video frame reconstruction model, performing feature abstraction to the input frame fragments through multiple hidden layers of the pre-trained video frame reconstruction model, and building a nonlinear mapping between each frame fragment and the corresponding frame fragment block.

After the extraction of the frame fragments of the compressed video frames, the pre-trained video frame reconstruction model can be used to process the frame fragments correspondingly. The video frame reconstruction model can be established and trained each time when the video compressed sensing reconstruction is carried out or can be a pre-established and pre-trained model which is called each time when video compressed sensing reconstruction is carried out, which is not limited herein.

For example, in the embodiment, the pre-trained video frame reconstruction model includes the input layer, an output layer, and multiple hidden layers. After the frame fragments of the compressed video frames are extracted, the extracted frame fragments are input to the input layer of the pre-trained video frame reconstruction model; the hidden layers perform feature abstraction to the input frame fragments, build the nonlinear mapping between each frame fragment and the corresponding frame fragment block, and thus form a connection between each frame fragment and the reconstructed frame fragment block.

Step S30, reconstructing the input frame fragments into the corresponding frame fragment block according to the nonlinear mapping built by the hidden layers of the pre-trained video frame reconstruction model, outputting reconstructed frame fragment blocks through the output layer of the pre-trained video frame reconstruction model, and generating are constructed video based on the reconstructed frame fragment blocks.

The hidden layers of the pre-trained video frame reconstruction model reconstruct the input frame fragments into the final frame fragment blocks according to the nonlinear mapping, that is, the mapping between each frame fragment and the corresponding final reconstructed frame fragment block after feature abstraction of each frame is performed. The reconstructed video frame blocks are output through the output layer and the reconstructed video is generated based on the reconstructed frame fragment blocks. In some embodiments, the frame fragment blocks can be spliced or combined to generate the reconstructed video, thereby realizing the rendering and reconstruction of the compressed video frames.

In the method of the present disclosure, the frame fragments of the to-be-reconstructed compressed video frames are extracted according to the predetermined extraction rule; feature abstraction is performed to each frame fragment through the multiple hidden layers of the pre-trained video frame reconstruction model, and the nonlinear mapping between each frame fragment and the corresponding frame fragment block is built; and the input frame fragments are reconstructed to the frame fragment blocks according to the nonlinear mapping, and the reconstructed video blocks are output. Since the reconstruction of the video is carried out corresponding to the frame fragments extracted from the to-be-reconstructed compressed video frames rather than by processing the large compressed video frames directly, thus the computing complexity is reduced and the reconstruction speed of the video is improved. In addition, since the feature abstraction of the frame fragment is carried out through the multiple hidden layers of the pre-trained video frame reconstruction model, and the frame fragments are reconstructed to the frame fragment blocks for outputting, each detailed feature of the compressed video frames can be effectively extracted and thus the quality of the reconstruction of the video frames is improved.

Figure 3:
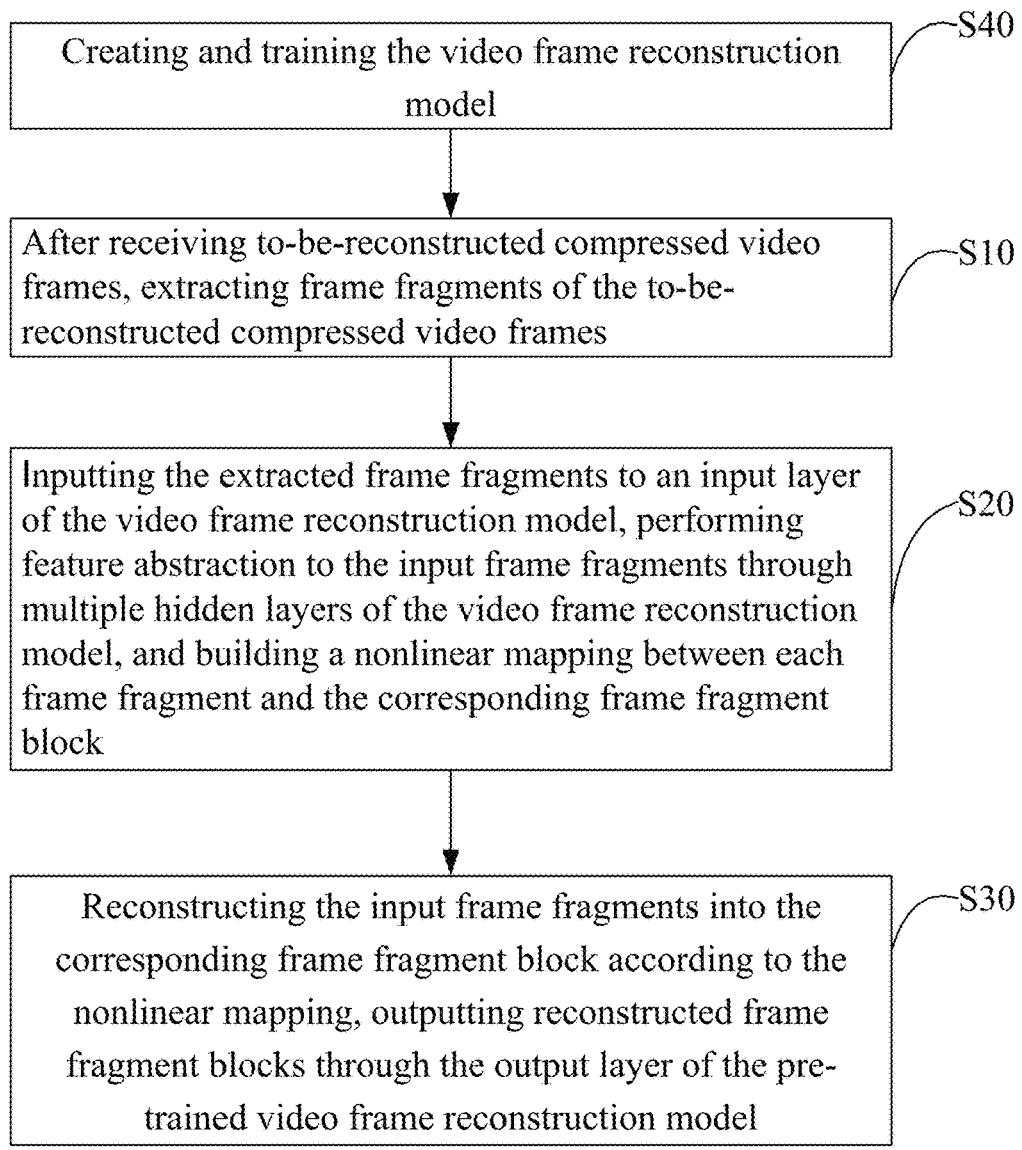
FIG. 3 is a flowchart illustrating processes of a video compressed sensing reconstruction method in accordance with a second embodiment of the present disclosure.

Referring to FIG. 3, a video compressed sensing reconstruction method in accordance with a second embodiment of the present disclosure is provided. The method of the second embodiment further includes following steps before step S10 of the method of the first embodiment.

Step S40, creating and training the video frame reconstruction model which includes at least one input layer, at least one output layer, and multiple hidden layers.

In the embodiment, before the reconstruction of the video frames, the pre-trained video frame reconstruction model is created and trained. The pre-trained video frame reconstruction model includes at least one input layer, one output layer, and multiple hidden layers. Before the video frame reconstruction model is trained, training data and testing data are generated.

A preset number (e.g., 100) of videos in various types of natural scenes are obtained, and each video is converted into a grayscale space. A total amount of data of all the videos satisfies a preset value (e.g., 10K).

Each converted video is compressed through a measurement transformation matrix having a pre-defined size being $w_m \cdot * \cdot h_m \cdot * \cdot d_m$ (e.g., $w_m=8$, $h_m=8$, $d_m=16$). For example, $w_b$ is a width of the video block having a preset number of videos, $h_b$ is a height of the video block, $d_b$ is a length of the video block (that is the number of the video frames). Each video block is $x_i \in w_b \times h_b \times d_b$, $i \in N$, wherein N is a positive integer no less than 1. The compressed video frame is $y_i \in w_b \cdot * \cdot h_b$, wherein $y_i = \varnothing_b x_i$, wherein $\varnothing_b$ is the measurement transformation matrix.

All the compressed videos are divided into a first data set and a second data set at a preset ratio such as X:Y (e.g., 7:3) wherein both X and Y are greater than 0. The number of the videos in first data set is greater than that of the videos in the second data set. The first data set is used as a training data set and the second data set is used as a testing data set.

In some embodiments, the training process of the video frame reconstruction model is as follows.

At the training of the video frame reconstruction model, a batch size of the input video frames is set to be 200, a total number of training times can be set to be $10*10^6$ times of iterations, and a size difference between every two video frames is specified within a range where an average value is 0 and a standard deviation is 1. At the beginning of the training process, neuron weight values of each hidden layer are initialized randomly, and the random value is selected from a uniform distribution within a range $$\left(\frac{-1}{\sqrt{s}}, \frac{1}{\sqrt{s}}\right),$$

wherein the variants is the number of neurons of the previous hidden layer.

During the training of the video frame reconstruction model, each parameter the video frame reconstruction model is optimized using the stochastic gradient descent (SGD) algorithm. The SGD algorithm is applicable in optimization control processes in which many control variables and complex controlled systems are involved and accurate mathematical models cannot be established. In some embodiments, an initial learning rate can be set to be 0.001, and the learning rate changes to one tenth of the initial value after $3*10^6$ times of iterations. A momentum of the SGD algorithm can be set to 0.9, and a gradient can be cut during the descent of the random gradient. Supposed the objective function to be proposed is $E(x)=f(x)+r(x)$, wherein $f(x)$ is a loss function which can be any differentiable convex function for evaluating a training loss of the video frame reconstruction model, $r(x)$ is a normalized constraint factor for constraining the factor. According to a probability distribution of the parameters of the model, $r(x)$ typically includes a L1 type of constraint (the model follows the Gauss distribution), and a L2 type of constraint (the model follows the Laplace distribution). The gradient can be kept within a certain range by cutting the weight updating gradient, such that a convergence of the model can be prevented from being affected by gradient explosion situation. The threshold value of the cutting of the gradient can be 10.

Figure 4:
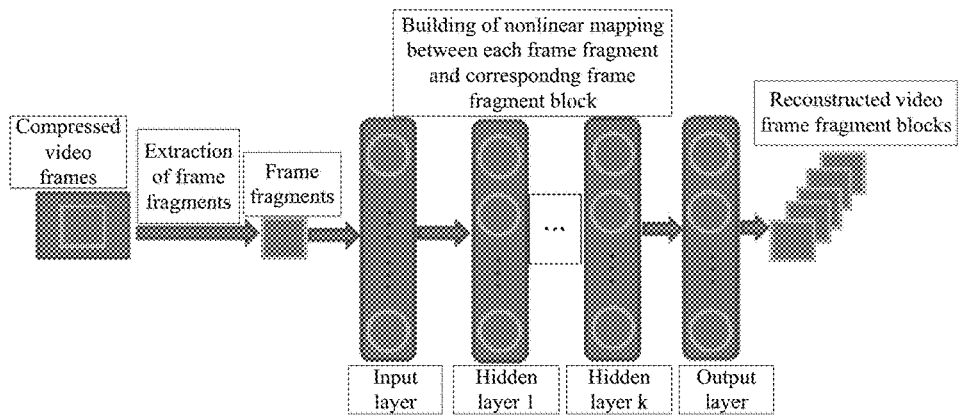
FIG. 4 is a schematic view of a video frame reconstruction model applied in the video compressed sensing reconstruction method in accordance with an embodiment of the present disclosure.

In other embodiments, as shown in FIG. 4, which is a schematic view of the video frame reconstruction model used in the video compressed sensing method in accordance with an embodiment, the video frame reconstruction model includes an input layer, an output layer, and k hidden layers (k is a natural number greater than 1) each of which has the following formula:

$$h_k(y) = \theta(b_k + w_k y);$$

wherein $h_k(y) \in R^{L_k}$ is an activation value vector of the hidden layer k; $L_k$ is the number of neurons of the hidden layer k, $\theta(*)$ that is $\theta(b_k+w_k y)$, is an activation function having a formula being $\theta(x) = \max(x, 0)$, $b_k \in R^{L_k}$ is a neuron bias vector of the hidden layer k, $w_k \in R^{L_{k-1} \times L_k}$ is a weight matrix, and $y \in R^{L_{k-1}}$ is an input vector of the hidden layer k.

The video frame reconstruction model $f(y_i;\omega)$ is obtained through training according to the activation value, the number of neurons, the activation function, the neuron bias value and the weight matrix, wherein $\omega$ is a parameter collection of the activation value, the number of the neurons, the neuron bias vector, and the weight matrix, $y_i$ is the frame fragment input by the input layer, $f(y_i;\omega)$ is the nonlinear mapping between each frame fragment and the corresponding frame fragment block which is built by performing the feature abstraction to the frame fragments input by the input layer through the hidden layers.

Referring to FIG. 4, the input layer receives the frame fragments; after the k hidden layers perform feature abstraction to the frame fragments, the frame fragment blocks enter into the output layer. Dimensions of the output layer are the same as the size of the video block finally reconstructed, both of which are $w_m \cdot * \cdot h_m \cdot * \cdot d_m$. In order to train the video frame reconstruction model, the weight values and bias of the model are continuously adjusted according to input parameters. Supposed that a set of all the parameters of the model is expressed as $L(\omega)$, an error back propagation (EP) algorithm is used to update the parameters, and the optimization function is mean squared error (MSE), a following formula can be obtained:

$$L(\omega), = , \frac{1}{N} \sum_{i=1}^{N} \| f(y_i; \omega) - x_i \|_2^2 .$$

In some embodiments, dimensions of the input layer of the video frame reconstruction model may be set to be 8*8, dimensions of the output layer may be set to be 8*8*16, and the video frame reconstruction model may include 7 hidden layers having dimensions thereof set to be 128, 256, 384, 512, 512, 4096, and 2048, respectively.

The present disclosure further provides a video compressed sensing reconstruction system.

Figure 5:
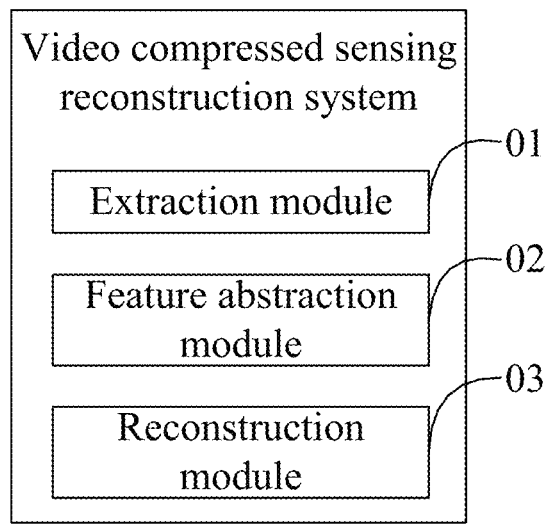
FIG. 5 is a block diagram of a video compressed sensing reconstruction system in accordance with a first embodiment of the present disclosure.

Referring to FIG. 5, which is a block diagram of a video compressed sensing reconstruction system in accordance with an embodiment of the present disclosure, the system includes an extraction module 01, a feature abstraction module 02, and a reconstruction module 03.

The extraction module 10 is configured for, after receiving to-be-reconstructed compressed video frames, extracting frame fragments of the to-be-reconstructed compressed video frames according to a predetermined extraction rule.

In the embodiments, after the to-be-reconstructed compressed video frames are received, the compressed video frames are not rendered and reconstructed directly, and the frame fragments are extracted from the compressed video frames according to the predetermined extraction rule at first. The predetermined extraction rule can be extracting the frame fragments according to features like color, content, format, or area, etc., which is not limited herein.

In some embodiments, the predetermined extraction rule is: dividing the to-be-reconstructed compressed video frames into blocks such that the to-be-reconstructed compressed video frames are divided into several frame fragments. For example, various types of the compressed video frames, such as compressed video frames of JPEG or PNG type are divided into N*M frame fragments when the compressed video frames are divided into blocks, wherein N and M are positive integers. The frame fragments are equal to each other. In other embodiments, the compressed video frames can be divided into unequal frame fragments according to a preset ratio or randomly, which is not limited herein. Each frame fragment can have a regular shape like a square or a rectangle or irregular shapes, which is not limited herein.

The feature abstraction module 02 is configured for inputting the extracted frame fragments to an input layer of a pre-trained video frame reconstruction model, performing feature abstraction to the input frame fragments through multiple hidden layers of the pre-trained video frame reconstruction model, and building a nonlinear mapping between each frame fragment and the corresponding frame fragment block.

After the extraction of the frame fragments of the compressed video frames, the pre-trained video frame reconstruction model can be used to process the frame fragments correspondingly. The video frame reconstruction model can be established and trained each time when the video compressed sensing reconstruction is carried out or can be a pre-established and pre-trained model which is called each time when video compressed sensing reconstruction is carried out, which is not limited herein.

For example, in the embodiment, the pre-trained video frame reconstruction model includes the input layer, an output layer, and multiple hidden layers. After the frame fragments of the compressed video frames are extracted, the extracted frame fragments are input to the input layer of the pre-trained video frame reconstruction model; the hidden layers perform feature abstraction to the input frame fragments, build the nonlinear mapping between each frame fragment and the corresponding frame fragment block, and thus form a connection between each frame fragment and the reconstructed frame fragment block.

The reconstruction module 03 is configured for reconstructing the input frame fragments into the corresponding frame fragment block according to the nonlinear mapping built by the hidden layers of the pre-trained video frame reconstruction model, outputting reconstructed frame fragment blocks through the output layer of the pre-trained video frame reconstruction model, and generating are constructed video based on the reconstructed frame fragment blocks.

The hidden layers of the pre-trained video frame reconstruction model reconstruct the input frame fragments into the final frame fragment blocks according to the nonlinear mapping, that is, the mapping between each frame fragment and the corresponding final reconstructed frame fragment block after feature abstraction of each frame is performed. The reconstructed video frame blocks are output through the output layer and the reconstructed video is generated based on the reconstructed frame fragment blocks. In some embodiments, the frame fragment blocks can be spliced or combined to generate the reconstructed video, thereby realizing the rendering and reconstruction of the compressed video frames.

In the method of the present disclosure, the frame fragments of the to-be-reconstructed compressed video frames are extracted according to the predetermined extraction rule; feature abstraction is performed to each frame fragment through the multiple hidden layers of the pre trained pre-trained video frame reconstruction model, and the nonlinear mapping between each frame fragment and the corresponding frame fragment block is built; and the input frame fragments are reconstructed to the frame fragment blocks according to the nonlinear mapping, and the reconstructed video blocks are output. Since the reconstruction of the video is carried out corresponding to the frame fragments extracted from the to-be-reconstructed compressed video frames rather than by processing the large compressed video frames directly, thus the computing complexity is reduced and the reconstruction speed of the video is improved. In addition, since the feature abstraction of the frame fragment is carried out through the multiple hidden layers of the pre-trained video frame reconstruction model, and the frame fragments are reconstructed to the frame fragment blocks for outputting, each detailed feature of the compressed video frames can be effectively extracted and thus the quality of the reconstruction of the video frames is improved.

Figure 6:
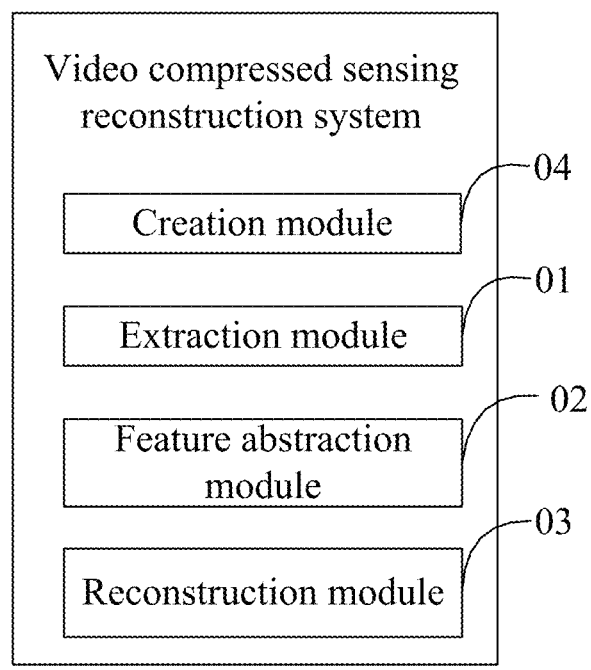
FIG. 6 is a block diagram of a video compressed sensing reconstruction system in accordance with a second embodiment of the present disclosure.

Referring to FIG. 6, a video compressed sensing reconstruction system in accordance with a second embodiment of the present disclosure is provided. Based on the system of the first embodiment, the system of the second embodiment further includes a creation module 04.

The creation module 04 is configured for creating and training the video frame reconstruction model which includes at least one input layer, at least one output layer, and multiple hidden layers.

In the embodiment, before the reconstruction of the video frames, the video frame reconstruction model is created and trained. The pre-trained video frame reconstruction model includes at least one input layer, one output layer, and multiple hidden layers. The creation module 04 includes a generation unit for generating training data and testing data. The generation unit obtains a preset number (e.g., 100) of videos in various types of natural scenes, and coverts and each video into a grayscale space. A total amount of data of all the videos satisfies a preset value (e.g., 10K).

The generation unit compresses each converted video through a measurement transformation matrix having a pre-defined size being $w_m \cdot * \cdot h_m \cdot * \cdot d_m$ (e.g., $w_m=8$, $h_m=8$, $d_m=16$). For example, $w_b$ is a width of the video block having a preset number of videos, $h_b$ is a height of the video block, $d_b$ is a length of the video block (that is the number of the video frames). Each video block is $x_i \in w_b \times h_b \times d_b$, $i \in N$, wherein N is a positive integer no less than 1. The compressed video frame is $y_i \in w_b \cdot * \cdot h_b$, wherein $y_i = \emptyset_b x_i$, wherein $\emptyset_b$ is the measurement transformation matrix.

The generation unit divides all the compressed videos into a first data set and a second data set at a preset ratio such as X:Y (e.g., 7:3) wherein both X and Y are greater than 0. The number of the videos in first data set is greater than that of the videos in the second data set. The first data set is used as a training data set and the second data set is used as a testing data set.

In some embodiments, the training process of the video frame reconstruction model is as follows.

At the training of the video frame reconstruction model, a batch size of the input video frames is set to be 200, a total number of training times can be set to be $10*10^6$ times of iterations, and a size difference between every two video frames is specified within a range where an average value is 0 and a standard deviation is 1. At the beginning of the training process, neuron weight values of each hidden layer are initialized randomly, and the random value is selected from a uniform distribution within a range $$\left(\frac{-1}{\sqrt{s}}, \frac{1}{\sqrt{s}}\right),$$

wherein the variants is the number of neurons of the previous hidden layer.

During the training of the video frame reconstruction model, each parameter the video frame reconstruction model is optimized using the stochastic gradient descent (SGD) algorithm. The SGD algorithm is applicable in optimization control processes in which many control variables and complex controlled systems are involved and accurate mathematical models cannot be established. In some embodiments, an initial learning rate can be set to be 0.001, and the learning rate changes to one tenth of the initial value after $3*10^6$ times of iterations. A momentum of the SGD algorithm can be set to 0.9, and a gradient can be cut during the descent of the random gradient. Supposed the objective function to be proposed is $E(x)=f(x)+r(x)$, wherein $f(x)$ is a loss function which can be any differentiable convex function for evaluating a training loss of the video frame reconstruction model, $r(x)$ is a normalized constraint factor for constraining the factor. According to a probability distribution of the parameters of the model, $r(x)$ typically includes a L1 type of constraint (the model follows the Gauss distribution), and a L2 type of constraint (the model follows the Laplace distribution). The gradient can be kept within a certain range by cutting the weight updating gradient, such that a convergence of the model can be prevented from being affected by gradient explosion situation. The threshold value of the cutting of the gradient can be 10.

In other embodiments, the video frame reconstruction model includes an input layer, an output layer, and k hidden layers (k is a natural number greater than 1) each of which has the following formula:

$$h_k(y) = \theta(b_k + w_k y);$$

wherein $h_k(y) \in R^{L_k}$ is an activation value vector of the hidden layer k; $L_k$ is the number of neurons of the hidden layer k, $\theta(*)$, that is $\theta(b_k + w_k y)$, is an activation function having a formula being $\theta(x) = \max(x, 0)$, $b_k \in R^{L_k}$ is a neuron bias vector of the hidden layer k, $w_k \in R^{L_{k-1} \times L_k}$ is a weight matrix, and $y \in R^{L_{k-1}}$ is an input vector of the hidden layer.

The video frame reconstruction model $f(y_i; \omega)$ is obtained through training according to the activation value, the number of neurons, the activation function, the neuron bias value and the weight matrix, wherein ω to is a parameter collection of the activation value, the number of the neurons, the neuron bias vector, and the weight matrix, $y_i$ is the frame fragment input by the input layer, $f(y_i; \omega)$ is the nonlinear mapping between each frame fragment and the corresponding frame fragment block which is built by performing the feature abstraction to the frame fragments input by the input layer through the hidden layers.

Referring to FIG. 4, the input layer receives the frame fragments, after the k hidden layers perform feature abstraction to the frame fragments, the frame fragment blocks enter into the output layer. Dimensions of the output layer are the same as the size of the video block finally reconstructed, both of which are $w_m \cdot * \cdot h_m \cdot * \cdot d_m$. In order to train the video frame reconstruction model, the weight values and bias of the model are continuously adjusted according to input parameters. Supposed that a set of all the parameters of the model is expressed as L(ω), an error back propagation (EP) algorithm is used to update the parameters, and the optimization function is mean squared error (MSE), a following formula can be obtained:

$$L(\omega), = , \frac{1}{N}\sum_{i=1}^{N} \|f(y_i; \omega) - x_i\|_2^2.$$

In some embodiments, dimensions of the input layer of the video frame reconstruction model may be set to be 8*8, dimensions of the output layer may be set to be 8*8*16, and the video frame reconstruction model may include 7 hidden layers having dimensions thereof set to be 128, 256, 384, 512, 512, 4096, and 2048, respectively.

In hardware implementation, the above extraction module 01, the feature abstraction module 02, the reconstruction module 03, and the creation module 04 can be embedded in or independent from the electronic device as hardware, or can be stored in a storage device of the electronic device as software such that a processor of the electronic device can execute the above modules to perform corresponding operations. It is understood that the above processor can be a central processing unit, a micro-processor, or single chip, etc.

The present disclosure further provides a computer-readable storage medium on which a video compressed sensing reconstruction system is stored. The video compressed sensing reconstruction system can be executed by at least one processor such that the at least one processor can perform steps of the video compressed sensing reconstruction method of the above embodiments which includes step S10, S20, and S30, etc., which is not given in detail any more herein.

It should be noted that the term "comprising", "including" or any other variants thereof are intended to cover a non-exclusive inclusion, such that the process, method, product or device including a number of elements not only include these elements, but also other elements not explicitly listed, or but also inherent elements for the process, method, product or device. Unless otherwise restricted, the elements defined by the statement "comprise a . . . " does not exclude other elements included in the process, method, product or device including the said elements.

Through the foregoing description of the embodiments, it is clear to a person skilled in the art that the present invention may be implemented by software plus necessary universal hardware, and definitely may also be implemented by hardware, but in many cases, the software implementation is preferred. Based on such understanding, the essence of the technical solutions of the present disclosure, or part that makes contributions to the prior art, or part of the technical solution may be embodied in the form of a software product. The computer software product is stored in a storage medium (ROM, RAM, disk, disc), including several instructions such that any terminal device (which can be a mobile phone, a computer, an air conditioner, or a network device) can execute the methods of the above embodiments.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

What is claimed is:

1. A video compressed sensing reconstruction method, comprising:
step B, after receiving to-be-reconstructed compressed video frames, extracting frame fragments of the compressed video frames according to a predetermined extraction rule, wherein the predetermined extraction rule comprises: dividing the to-be-reconstructed compressed video frames into blocks, and thus dividing the to-be-reconstructed compressed video frames into the frame fragments;
step C, inputting the frame fragments into an input layer of a pre-trained video frame reconstruction model, performing feature abstraction to the frame fragments through multiple hidden layers of the video frame reconstruction model, and building a nonlinear mapping between each frame fragment and a corresponding frame fragment block; and
step D, reconstructing the input frame fragments to frame fragment blocks by the hidden layers according to the nonlinear mapping, and outputting the frame fragment blocks by an output layer of the video frame reconstruction model, and generating a reconstructed video based on the reconstructed frame fragment blocks;
wherein the video frame reconstruction model comprises one input layer, one output layer, and k hidden layers wherein k is a natural number being greater than 1, and each of the hidden layers comprises:

$$h_k(y) := \theta(b_k + w_k y);$$

wherein $h_k(y) \in R^{L_k}$ is an activation value vector of the hidden layer, $L_k$ is the number of neurons of the hidden layer k, $\theta(b_k + w_k y)$ is an activation function, $b_k \in R^{L_k}$ is a neuron bias vector of the hidden layer, $w_k \in R^{L_{k-1} \times L_k}$ is a weight matrix, $y \in R^{L_{k-1}}$ is an input vector of the hidden layer; the video frame reconstruction model $f(y_i; \omega)$ is obtained through training according to the activation value, the number of neurons, the activation function, the neuron bias value, and the weight matrix, wherein $\omega$ is a parameter collection of the activation value the number of the neurons the neuron bias vector, and the weight matrix, $y_i$ is the frame fragment input by the input layer, $f(y_i; \omega)$ is the nonlinear mapping between each frame fragment and the corresponding frame fragment block which is built by performing the feature abstraction to the frame fragments input by the input layer by the hidden layers.

2. An electronic device, comprising a processor, a storage device and a video compressed sensing reconstruction system; the video compressed sensing reconstruction system being stored in the storage device and comprising at least one computer-readable instruction which is capable of being executed by the processor to perform:
after receiving to-be-reconstructed compressed video frames, extracting frame fragments of the compressed video frames according to a predetermined extraction rule, wherein the predetermined extraction rule comprises: dividing the to-be-reconstructed compressed video frames into blocks, and thus dividing the to-be-reconstructed compressed video frames into the frame fragments;
inputting the frame fragments into an input layer of a pre-trained video frame reconstruction model, performing feature abstraction to the frame fragments through multiple hidden layers of the video frame reconstruction model, and building a nonlinear mapping between each frame fragment and a corresponding frame fragment block; and
reconstructing the input frame fragments to frame fragment blocks by the multiple hidden layers according to the nonlinear mapping, outputting the frame fragment blocks by an output layer of the video frame reconstruction model, and generating a reconstructed video based on the reconstructed frame fragment blocks;

wherein the video frame reconstruction model comprises one input layer, one output layer, and k hidden layers wherein k is a natural number being greater than 1, and each of the hidden layers comprises:

$$h_k(y) = \theta(b_k + w_k y);$$

wherein $h_k(y) \in R^{L_k}$ is an activation value vector of the hidden layer, $L_k$ is the number of neurons of the hidden layer k, $\theta(b_k + w_k y)$ is an activation function, $b_k \in R^{L_k}$ is a neuron bias vector of the hidden layer, $w_k \in R^{L_{k-1} \times L_k}$ is a weight matrix, $y \in R^{L_{k-1}}$ is an input vector of the hidden layer; the video frame reconstruction model $f(y_i; \omega)$ is obtained through training according to the activation value, the number of neurons, the activation function, the neuron bias value, and the weight matrix, wherein $\omega$ is a parameter collection of the activation value the number of the neurons the neuron bias vector, and the weight matrix, $y_i$ is the frame fragment input by the input layer, $f(y_i; \omega)$ is the nonlinear mapping between each frame fragment and the corresponding frame fragment block which is built by performing the feature abstraction to the frame fragments input by the input layer by the hidden layers.

3. A non-transitory computer-readable storage medium with at least one computer-readable instruction stored thereon, which can be executed by at least one processor to perform:

after receiving to-be-reconstructed compressed video frames, extracting frame fragments of the compressed video frames according to a predetermined extraction rule, wherein the predetermined extraction rule comprises: dividing the to-be-reconstructed compressed video frames into blocks, and thus dividing the to-be-reconstructed compressed video frames into the frame fragments;

inputting the frame fragments into an input layer of a pre-trained video frame reconstruction model, performing feature abstraction to the frame fragments through multiple hidden layers of the video frame reconstruction model, and building a nonlinear mapping between each frame fragment and a corresponding frame fragment block; and reconstructing the input frame fragments to frame fragment blocks by the multiple hidden layers according to the nonlinear mapping, outputting the frame fragment blocks by an output layer of the video frame reconstruction model, and generating a reconstructed video based on the reconstructed frame fragment blocks;

wherein the video frame reconstruction model comprises one input layer, one output layer, and k hidden layers wherein k is a natural number being greater than 1, and each of the hidden layers comprises:

$$h_k(y) = \theta(b_k + w_k y);$$

wherein $h_k(y) \in R^{L_k}$ is an activation value vector of the hidden layer, $L_k$ is the number of neurons of the hidden layer k, $\theta(b_k + w_k y)$ is an activation function, $b_k \in R^{L_k}$ is a neuron bias vector of the hidden layer, $W_k \in R^{L_{k-1} \times L_k}$ is a weight matrix, $y \in R^{L_{k-1}}$ is an input vector of the hidden layer; the video frame reconstruction model $f(y_i; \omega)$ is obtained through training according to the activation value, the number of neurons, the activation function, the neuron bias value, and the weight matrix, wherein $\omega$ is a parameter collection of the activation value the number of the neurons the neuron bias vector, and the weight matrix, $y_i$ is the frame fragment input by the input layer, $f(y_i; \omega)$ is the nonlinear mapping between each frame fragment and the corresponding frame fragment block which is built by performing the feature abstraction to the frame fragments input by the input layer by the hidden layers.

* * * * *